United States Patent [19]
Yatsu et al.

[11] Patent Number: 4,606,654
[45] Date of Patent: Aug. 19, 1986

[54] CROSS ROLLER BEARING

[75] Inventors: Takashi Yatsu, Himeji; Tatsuo Mottate, Mitaka, both of Japan

[73] Assignee: Nippon Thompson Co., Ltd., Tokyo, Japan

[21] Appl. No.: 677,258

[22] Filed: Dec. 3, 1984

[30] Foreign Application Priority Data

Dec. 6, 1983 [JP] Japan .................. 58-187499[U]

[51] Int. Cl.$^4$ ............................................ F16C 19/30
[52] U.S. Cl. .................... 384/447; 384/619; 384/622
[58] Field of Search ............... 384/447, 619, 560, 622, 384/559

[56] References Cited

U.S. PATENT DOCUMENTS 2,055,714 9/1936 Baker .................................. 384/560
2,708,767 5/1955 Dean .................................. 384/447
3,275,391 9/1966 Blais .................................. 384/447

Primary Examiner—Lenard A. Footland
Attorney, Agent, or Firm—Alan H. MacPherson; Steven F. Caserza; Richard Franklin

[57] ABSTRACT

A cross roller bearing includes an inner ring, an outer ring and a plurality of generally cylindrically shaped rollers placed in a channel defined between the inner and outer rings as being alternately crossed with any two adjacent rollers having their axes of rotation directed perpendicular to each other. Both of the inner and outer rings are unitary in structure. In one form of the invention, the outer ring is provided with a radial hole extending therethrough radially, through which the rollers may be inserted in the channel defined between the inner and outer rings. An insert is also provided to be fixedly fitted into the radial hole so as to close the radial hole after insertion of the rollers into the channel.

9 Claims, 16 Drawing Figures

CROSS ROLLER BEARING

BACKGROUND OF THE INVENTION

1. Field of the Invention

This invention generally relates to a roller bearing, and, in particular, to a cross roller bearing including a plurality of rollers arranged along a predetermined path with their axes of rotation crossed between the two adjacent rollers when viewed in the direction of movement along said path.

2. Description of the Prior Art

A cross roller bearing is well known in the art. As shown in FIGS. 1 and 2, a typical cross roller bearing includes a plurality of rollers 1 arranged as being crossed along a path defined between an inner ring 2 and an outer ring 3. That is, the inner ring 2 is provided with a V-shaped groove along its outer periphery and the outer ring 3 is provided with a corresponding V-shaped groove along its inner periphery, and when the inner and outer rings 2 and 3 are put together as shown in FIG. 1, there is defined a channel having a generally square cross section. The channel defines a travelling path for the rollers 1 which are in rolling contact with the inner and outer rings 2 and 3 when set in position as shown in FIGS. 1 and 2, so that the inner and outer rings 2 and 3 are relatively rotatable through the rollers 1. Although not shown specifically, in the cross roller bearing shown in FIGS. 1 and 2, the rollers 1 are arranged such that the two adjacent rollers 1 are crossed with their axes of rotation directed perpendicular to each other when viewed in the direction of movement of the rollers 1.

In the prior art cross roller bearing, as shown in FIGS. 1 and 2, at least one of the inner and outer rings 2 and 3 (outer ring 3 in the illustrated example) was manufactured in two halves which were then put together by an appropriate fixing means, such as a bolt and nut combination. That is, in the structure illustrated in FIGS. 1 and 2, the outer ring 3 is divided into two halves 3a and 3b by a plane perpendicular to the centerline axis of the outer ring 3. Such a division of the outer ring 3 is necessary for assemblage of the bearing because the rollers 1 must be placed in position in the channel defined between the inner and outer rings 2 and 3. In the illustrated example, as best shown in FIG. 2, the top and bottom outer ring halves 3a and 3b are fixedly held together by means of a combination of bolt 4a and nut 4b, a plurality of which are typically arranged spaced apart circumferentially at equal interval.

In assembling the structure shown in FIGS. 1 and 2, for example, the bottom outer ring half 3b is first fitted onto the inner ring 2, which is unitary in structure. Then, the rollers 1 are placed in a gap defined between the inner ring 2 and the bottom outer ring half 3b such that the two adjacent rollers 1 are crossed with their axes of rotation extending perpendicular to each other when viewed in the direction of movement of the rollers 1. When the gap is filled with the rollers 1 in cross arrangement, the top outer ring half 3a is fitted onto the inner ring 2 thereby being brought into mating contact with the bottom outer ring half 3b whereby a plurality of through-holes provided in the top outer ring half 3a and spaced apart from each other circumferentially are matched to a like plurality of corresponding through-holes provided similarly in the bottom ring half 3b. Then, bolts 4a and nuts 4b are put together and tightened to complete assembling of the cross roller bearing.

The prior art cross roller bearing of the type described above suffers from various disadvantages. For example, since at least one of the inner and outer rings 2 and 3 is manufactured in two halves, it is more time consuming and expensive manufacturing such a ring of unitary structure. In addition, since the two halves are held together by a fixing means, there is a risk of loosening, which, in turn, causes a deterioration in bearing performance. Furthermore, since use must be made of a fixing means, such as the bolt and nut combination in the illustrated example, the ring which is divided into two halves must be provided with enlarged sections so as to compensate for the reduction in strength due to the provision of through-holes. In this connection, as shown in FIG. 2, that portion of the outer ring 3 which is provided with through-holes, through which the bolt 4a extends, has a local radial thickness $T_2$ which is substantially larger than the radial thickness $T_1$ of the inner ring 2. Thus, the prior art cross roller bearing is relatively large in size and thus heavy in weight.

SUMMARY OF THE INVENTION

It is therefore a primary object of the present invention to obviate the disadvantages of the prior art as described above and to provide an improved cross roller bearing.

Another object of the present invention is to provide an improved cross roller bearing which is simple in structure and reliable in operation.

A further object of the present invention is to provide an improved cross roller bearing which is sturdy in structure and compact in size.

A still further object of the present invention is to provide an improved cross roller bearing high in accuracy but low in cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
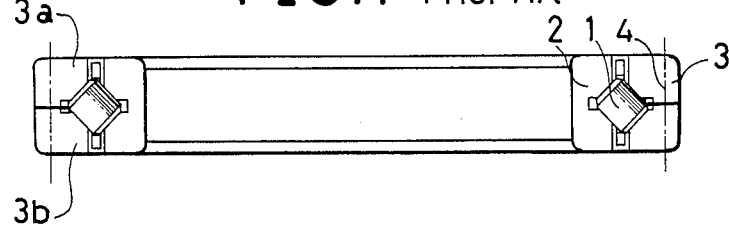
FIG. 1 is a longitudinal, cross sectional view showing the overall structure of a typical prior art cross roller bearing.
Figure 2:
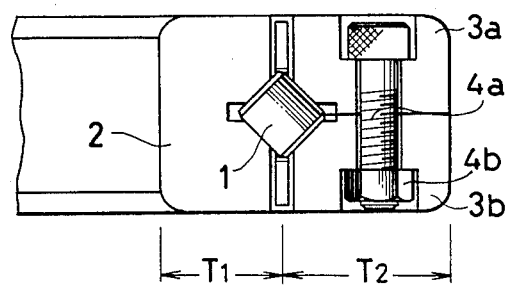
FIG. 2 is a fragmentary, cross sectional view showing on an enlarged scale part of the structure shown in FIG. 1.
Figure 3:
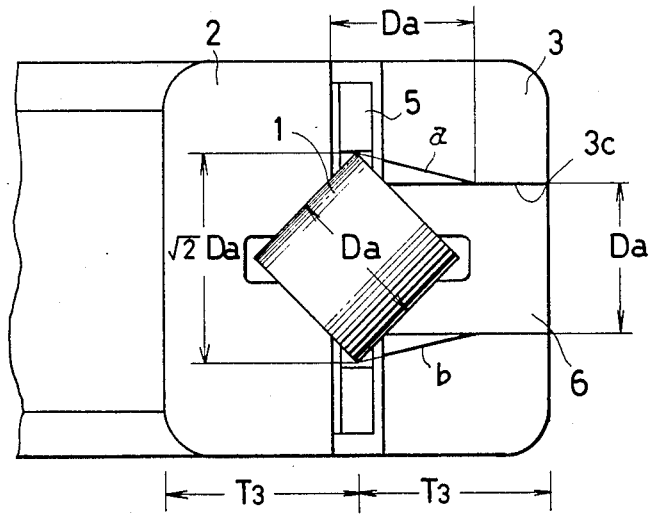
FIG. 3(a) is a fragmentary, cross sectional view showing part of a cross roller bearing constructed in accordance with one embodiment of the present invention.
FIG. 3(b) is a fragmentary, side elevational view of the structure shown in FIG. 3(a)
Figure 3:
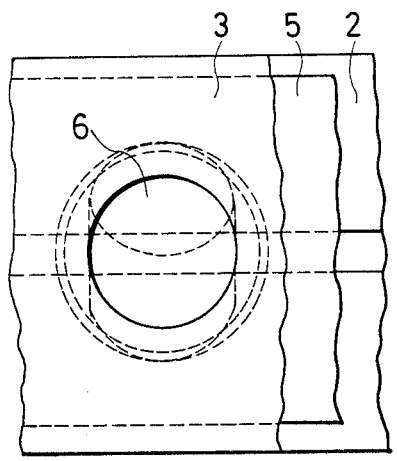

Referring now to FIG. 3(a), there is shown a cross roller bearing constructed in accordance with one embodiment of the present invention, and, as shown, the cross roller bearing includes a plurality of rollers 1, inner ring 2 and outer ring 3. As with the structure shown in FIGS. 1 and 2, the inner ring 2 of this embodiment is provided with a V-shaped groove extending circumferentially along its outer periphery and the outer ring 3 is provided with a corresponding V-shaped groove also extending circumferentially along its inner periphery, so that there is defined a channel, which is generally square in cross section and annular in shape, between the inner and outer rings 2 and 3. The rollers 1 are placed in this channel such that the two adjacent rollers 1 are crossed with their axes of rotation extending perpendicular to each other when viewed in the direction of movement of the rollers 1. The rollers 1 are all the same in size and shape, and, in the illustrated embodiment, the rollers 1 are cylindrical in shape having the same size Da in diameter and height.

Of importance, each of the inner and outer rings 2 and 3 is annular in shape and unitary in structure. In the illustrated embodiment, the outer ring 3 is provided with a radial hole 3c which extends through the radial thickness of the outer ring 3 and serves as an opening for placing the rollers 1 in position along the travelling channel or path defined between the inner and outer rings 2 and 3 when they are put together. In the illustrated embodiment, the radial hole 3c includes a first or lead-in section, which extends inwardly over a predetermined distance from the outer periphery of the outer ring 3 and is cylindrical in shape having a diameter of approximately Da but larger than the diameter Da of the rollers 1, and a second or flared out section, which extends continuously from the end of the first section toward the inner periphery of the outer ring 3, as gradually increasing its size. In the embodiment shown in FIG. 3(a), the flared out section has a truncated conical shape whose small end has a diameter of approximately Da and whose large end surface having a diameter of approximately square root 2 times Da.

With such a structure, the roller 1 may be first pushed into the straight lead-in section from outside and it may be turned over 45° as it moves along the flared out section to be set in position along the channel defined between the inner and outer rings 2 and 3. Also provided in the structure of FIG. 3(a) is an insert 6 which may be inserted and fixed in the radial hole 3c by any fixing means. The insert 6 is generally cylindrical in shape having a diameter of approximately Da, and its forward end is formed with a V-shaped groove which aligns with the V-shaped groove formed along the inner periphery of the outer ring 3 thereby defining part of the travelling channel for the rollers 1. Of course, such an alignment is obtained when the insert 6 is set in position in the radial hole 3c.

For fixing means, an interference fit or threaded engagement may be provided between the lead-in section of the radial hole 3c and the insert 3c, or a small threaded hole may be provided in the outer ring 3 with a bolt threaded into such a threaded hole to fix the insert 6 in position. In the illustrated embodiment, there is also provided a retainer 5 extending circumferentially in the gap defined between the inner and outer rings 2 and 3 and, as is well known in the art, the retainer 5 is structured to hold the rollers 1 spaced apart from each other at an intended interval in the circumferential direction. It is to be noted however that the retainer 5 may be discarded, if desired, in which case, adjacent rollers 1 are in direct contact.

As is obvious from the structure shown in FIG. 3(a), the inner and outer rings 2 and 3 are approximately the same in radial thickness, which is indicated by $T_3$. Described more in detail in this respect, since each of the inner and outer rings 2 and 3 of the present cross roller bearing has a unitary structure and is not divided into two halves as in the prior art structure shown in FIGS. 1 and 2, there is no need to provide locally enlarged sections in the outer ring 3, which is advantageous in manufacture and allows the entire structure to be light in weight and compact in size. Moreover, there is no risk of the bearing falling apart even if severe vibration is imparted and thus durability is significantly enhanced.

The manner of placing the rollers 1 in position along the travelling channel or path defined between the inner and outer rings 2 and 3, will be described more in detail with particular reference to FIGS. 3(b) and 4. That is, with the insert 6 removed from the radial hole 3c, the roller 1 is pushed into the radial hole 3c. And, thus, it advances like a piston while it moves through the lead-in, cylindrical section of the radial hole 3c. Then, as the roller 1 is pushed further into the flared out section of the radial hole 3c, either left or right side of the roller 1 is preferentially pushed strongly to have the roller 1 turned as it advances until the roller 1 is finally set in position along the travelling path by having turned 45° as clearly indicated in FIG. 4. In this instance, use is preferably made of an elongated stick to push the selected side of the roller 1 at its end surface. Then, the next roller 1 is pushed into the lead-in section of the radial hole 3c and when it is located at the flared out section of the radial hole 3c, the other left or right side of the end surface of the roller 1 is preferentially pushed to have it turned 45° in the direction opposite to the previous one. In this manner, the rollers 1 are placed into the travelling path between the inner and outer rings 2 and 3 one after another by turning them 45° alternately in opposite directions, i.e., clockwise or counterclockwise. As a result, the travelling path is finally filled with a predetermined number of rollers 1 in cross arrangement such that any two adjacent rollers 1 are oriented with their axes of rotation directed perpendicular to each other when viewed in the direction of movement of the rollers 1.

Figure 4:
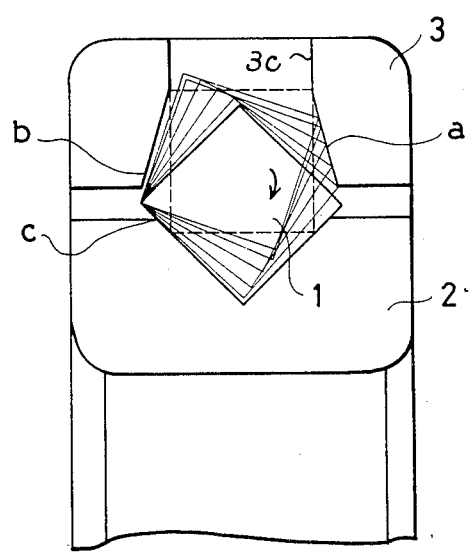
FIG. 4 is a schematic illustration showing how the roller 1, generally cylindrical in shape, is placed in position along the path defined between the inner and outer rings 2 and 3, which are both unitary in structure.

In the structure shown in FIG. 4, the flared out section of the radial hole 3c is in the shape of a truncated cone which is indicated by lines a and b. In FIG. 4, the position of the roller 1 which has been just pushed out of the lead-in section of the radial hole 3c into the flared out section is indicated by the dotted line. From this position indicated by the dotted line, the roller 1 may be turned, clockwise in the illustrated example, until it becomes engaged with the V-shaped groove c defined in the outer periphery of the inner ring 2. If the V-shaped groove c of the inner ring 2 is shallower than illustrated, then the flared out section of radial hole 3c must be made longer to allow the roller 1 to turn properly.

Figure 5:
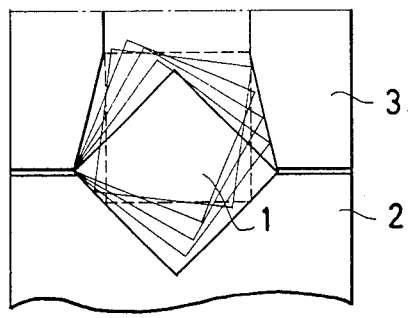
FIGS. 5(a)-(c) are schematic illustrations showing a few alternative embodiments.

FIGS. 5(a)–5(c) show several embodiments which differ in amount of spacing between the inner and outer rings 2 and 3. As is obvious, the spacing is gradually made larger from FIG. 5(a) to FIG. 5(c). In all of these figures, the dotted squares indicate the position where the turning of roller 1 in either direction may be initiated. Thus, the maximum size of the flared out section depends on the spacing between the inner and outer rings 2 and 3, and it must be as large as approximately square root 2 times Da, which is the situation when the spacing between the inner and outer rings 2 and 3 is minimum as shown in FIG. 5(a).

Figure 6:
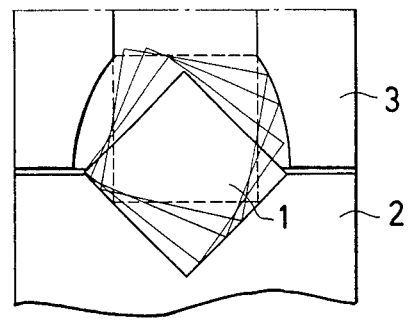
FIGS. 6(a)-(c) are schematic illustrations showing a few further alternative embodiments.
Figure 5:
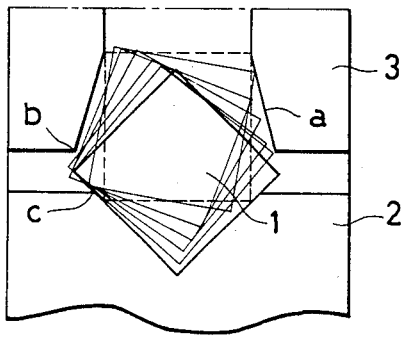
Figure 6:
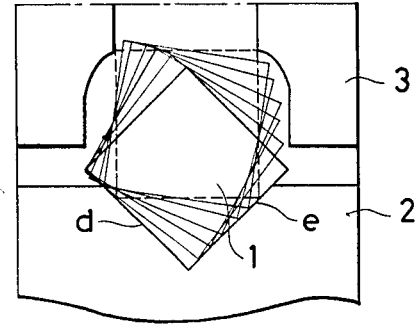
Figure 5:
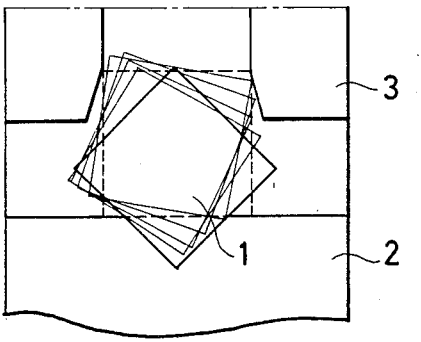
Figure 6:
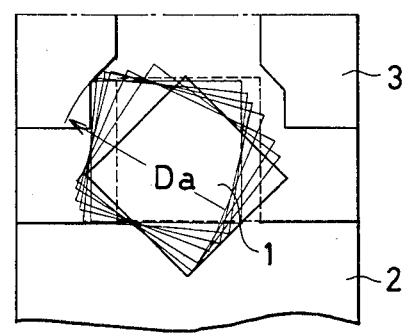

FIGS. 6(a)–6(c) show modified embodiments which have differently shaped flared out sections and which are also different in spacing between the inner and outer rings 2 and 3. In the cases shown in FIGS. 5(a)–5(c), in which the roller 1 is turned 45° as its one edge slides along the wall a when turned clockwise, the left bank edge of the V-shaped groove c which is in contact with the roller 1 serves effectively as a pivotal point. In the cases shown in FIGS. 6(a)–6(c), the roller 1 is turned 45° with one edge guided along a slope e when turned clockwise, or along the other slope d when turned counterclockwise. In this manner, the flared out section may take any desired shape as long as it allows the roller 1 to turn 45° until it is properly engaged in the V-shaped groove of the inner ring 2.

Figure 7:
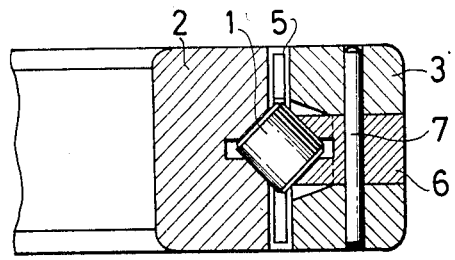
FIG. 7 is a fragmentary, cross sectional view showing part of a cross roller bearing constructed in accordance with a further embodiment of the present invention.
Figure 8:
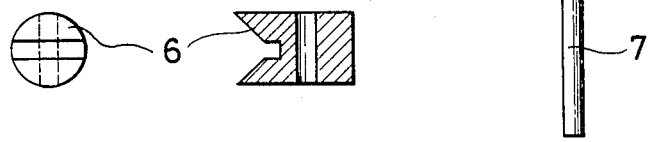
FIGS. 8(a)–(c) are schematic illustrations showing parts of the structure of FIG. 7.

FIG. 7 shows another embodiment of the present invention in which use is made of a pin 7 which is tightly fitted into holes formed in the outer ring 3 and the insert 6 to keep the insert 6 in position. The detailed structure of the insert 6 is shown in side view in FIG. 8(a) and in cross section in FIG. 8(b). As shown, the insert 6 is generally cylindrical in shape and provided with a V-shaped notch at its forward end. As mentioned earlier, this V-shaped notch is aligned with the V-shaped groove of the outer ring 3 when the insert 6 is set in position thereby defining part of the travelling path of the rollers 1. FIG. 8(c) illustrates pin 7 which serves as a fixing means to keep insert 6 in position.

Figure 9:
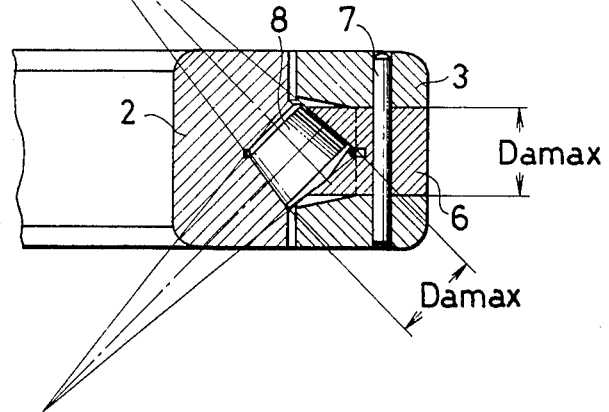
FIG. 9 is a fragmentary, cross sectional view showing part of a cross roller bearing constructed in accordance with a still further embodiment of the present invention.

FIG. 9 shows a further embodiment of the present invention in which use is made of rollers 8 which have the identical shape of truncated cone having the maximum diameter of Damax. In this case, the grooves defined in the inner and outer rings 2 and 3 are not identical and they are not exactly V-shaped. As shown in FIG. 9, the corresponding opposite walls of inner and outer rings 2 and 3 are inclined in commensurate with the slope the side wall of truncated cone-shaped roller 8. Rollers 8 are arranged in the channel between the inner and outer rings 2 and 3 so that any two adjacent rollers 8 are oriented with their longitudinal axes extending normal to each other when viewed in the direction of movement of the rollers 8. In particular, in the illustrated embodiment of FIG. 9, alternate rollers 8 have their imaginary tip ends directed inwardly at one side of the bearing assembly and the other alternate rollers 8 have their imaginary tip ends directed inwardly at the other side of the bearing assembly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A roller bearing assembly comprising:
    an inner ring provided with a first groove extending circumferentially along an outer periphery thereof;
    an outer ring provided with a second groove extending circumferentially along an inner periphery thereof, whereby said first and second grooves define a channel when said inner and outer rings are set in position relative to each other, said outer ring being provided with at least one radial hole extending through said outer ring in the direction of a selected radius of said outer ring;
    a plurality of rollers of predetermined shape which are set in position by being inserted through said radial hole into and along said channel to be in rolling contact with said inner and outer rings thereby allowing said inner and outer rings to rotate relative to each other;
    said radial hole having a first section means which is cylindrical in shape, extending from the outer periphery of said outer ring inwardly over a predetermined distance, and having a diameter of a size that said rollers pass therethrough only when the axes of rotation of said rollers are coextensive with that axis of said radial hole which extends along said selected radius; and
    a second section means which is flared out from the inward end of said first section toward the inner periphery of said outer ring wherein said flared out section means is shaped to allow said rollers to turn at least 45° to be properly set in position in said channel so as to define an intended cross arrangement; and
    an insert which may be fixedly set in position as inserted in said radial hole thereby plugging said radial hole after insertion of said rollers into said channel.

2. The assembly of claim 1 wherein said rollers are identically and cylindrically shaped each roller having a first predetermined size as its diameter and its height, and wherein said rollers are set in said channel such that any two adjacent rollers are oriented with their axes of rotation directed perpendicular to each other when viewed in the direction of movement of said rollers along said channel.

3. The assembly of claim 2 wherein said first and second grooves are generally V-shaped thereby defining said channel to be generally square in cross section.

4. The assembly of claim 1 wherein said rollers are identically shaped in the form of a truncated cone and wherein said rollers are set in said channel such that any two adjacent rollers are oriented with their axes of rotation directed perpendicular to each other when viewed in the direction of movement of said rollers along said channel.

5. The assembly of claim 4, wherein said first and second grooves are generally V-shaped and
    the interior angle of said first groove is chosen to correspond to the angle between a first end of said truncated cone and the side of said truncated cone, and
    the interior angle of said second groove is chosen to correspond to the angle between a second end of said truncated cone and the side of said truncated cone.

6. The assembly of claim 1 wherein said insert is generally cylindrical in shape and provided with a V-shaped notch at its forward end, which may be aligned with said second groove of said outer ring when said insert is set in position thereby defining part of said channel to guide the movement of said rollers along said channel.

7. The assembly of claim 6 further comprising fixing means for fixing said insert in position as inserted in said radial hole.

8. The assembly of claim 7 wherein said fixing means is a threaded engagement between said insert and said radial hole.

9. The assembly of claim 7 wherein said outer ring is provided with a first hole and said insert is provided with a second hole which aligns with said first hole when said insert is set in position in said radial hole, and wherein said fixing means is a pin which may be tightly fitted through said first and second holes thereby keeping said insert in position.

* * * * *